United States Patent [19]
Roffelsen

[11] Patent Number: 5,601,635
[45] Date of Patent: Feb. 11, 1997

[54] METHOD AND APPARATUS FOR DEAERATING A LIQUID IN A SUBSTANTIALLY CLOSED LIQUID CIRCULATION SYSTEM

[75] Inventor: Franciscus Roffelsen, Helmond, Netherlands

[73] Assignee: Spiro Research B.V., Helmond, Netherlands

[21] Appl. No.: 328,503

[22] Filed: Oct. 25, 1994

[30] Foreign Application Priority Data

Nov. 4, 1993 [NL] Netherlands ............. 9301908

[51] Int. Cl.⁶ ................................. B01D 19/00
[52] U.S. Cl. ................. 95/248; 95/266; 96/165; 96/194
[58] Field of Search ............... 95/247, 266, 248; 96/193, 165, 194

[56] References Cited

U.S. PATENT DOCUMENTS

| | | | |
|---|---|---|---|
| 2,685,937 | 8/1954 | Clark et al. | 95/266 X |
| 3,431,708 | 3/1969 | Moore | 95/266 X |
| 3,704,567 | 12/1972 | Engel | 95/247 X |
| 4,027,691 | 6/1977 | Roffelsen | 96/165 X |
| 4,115,079 | 9/1978 | Pockrandt et al. | 95/247 |
| 4,318,715 | 3/1982 | Chou | 95/247 X |
| 4,704,140 | 11/1987 | Kujala | 95/266 X |
| 4,743,338 | 5/1988 | Prough | 95/247 X |
| 4,853,006 | 8/1989 | Mangnall | 95/266 X |
| 5,112,357 | 5/1992 | Bjerklund et al. | 95/266 X |
| 5,409,523 | 4/1995 | Haeuser | 95/266 X |

FOREIGN PATENT DOCUMENTS 1244778  11/1988  Canada.
0187683   7/1986  European Pat. Off..

*Primary Examiner*—Richard L. Chiesa
*Attorney, Agent, or Firm*—Varnum, Riddering, Schmidt & Howlett LLP

[57] ABSTRACT

A method and apparatus for deaerating a liquid in a substantially closed liquid circulation system, wherein an amount of liquid is withdrawn from the circulation system and is introduced into a closed reservoir via a valve which is alternately open and closed, wherein by a pump which is operative in the open as well as the closed positions of the valve an underpressure can be created in the reservoir for the purpose of deaerating the liquid, and the liquid can be sucked from the reservoir and added to the circulation system again, separated air being discharged via a vent unit to the environment. For the valve adapted to be opened and closed alternately, preferably a throttling valve is used.

10 Claims, 1 Drawing Sheet

METHOD AND APPARATUS FOR DEAERATING A LIQUID IN A SUBSTANTIALLY CLOSED LIQUID CIRCULATION SYSTEM

BACKGROUND OF THE INVENTION

1. Field of the Invention

This invention relates to a method for deaerating a liquid in a substantially closed liquid circulation system, in which an amount of liquid is withdrawn from the circulation system and is introduced via a valve into a closed reservoir, by means of a pump the pressure in the reservoir is reduced for deaerating the liquid and the liquid is sucked from the reservoir and added to the circulation system again, and separated air is discharged via a vent unit to the environment. This invention also relates to an apparatus for practicing such method.

2. Background Art

A method of the type described in the opening paragraph hereof is known from European patent application A3-0 187 683, more specifically FIG. 5 of that publication and the discussion thereof. In this known method, liquid is added to the reservoir until a level gauge gives a first signal, which causes the valve to close and the pump, having been stationary up to that moment, to start operating. The pumping action creates an underpressure in the reservoir, so that water is sucked in via a pipe which branches off from the supply at a point upstream of the valve and which includes a reducing valve. As the water flows into the reservoir, it is degassed due to the reduced pressure condition prevailing there. Due to the action of the pump, the liquid level in the reservoir falls until the level gauge gives a second signal, which switches off the pump and opens the valve. The water to be deaerated now flowing in displaces the separated air already present in the reservoir via a float valve and a non-return valve into the environment. As soon as sufficient water has flowed through the valve into the reservoir, the level gauge gives a first signal again, thereby initiating a next air separation phase. Thus the process comprises an air separation phase, in which the pump rotates and the valve is closed, and an air blow-off phase, in which the pump is stationary and the valve is open. In other words, the process is a discontinuous process in which various valves have to be controlled and the pump has to be set in operation and stopped. This disadvantage is recognized and an attempt is made to reduce the less desired effect thereof by designing the level gauge in such a manner that the air separation phase lasts as long as possible.

SUMMARY OF THE INVENTION

The object of the invention is to improve a method of the type described in the opening paragraph hereof in such a manner that deaeration in fact no longer involves two discrete phases regaliated by a series of control operations, and, in a manner of speaking, a continuously operating process is obtained.

This is realized in accordance with the invention if by means of the valve the supply to the reservoir is alternately opened and closed, while the pump keeps operating continuously. Through these measures, the pressure in the reservoir will be reduced in the closed position of the valve, so that the liquid present is deaerated. When the valve is subsequently opened, the deaerated water is displaced from the reservoir into the liquid circulation system and liquid to be deaerated enters the reservoir. When in the reservoir an amount of air has been separated such that a head of air is formed which brings the vent unit into its open position, air is blown off to the environment. Thus, with extremely simple measures a system is obtained which, at least as far as the control thereof and the pumping action are concerned, in fact works continuously, requiring no more than the control of the opening and closing of the valve. Because such control can be effected cyclically, for instance every 15 seconds, it can be realized in an extremely simple manner from a control engineering point of view, for instance by means of a continuously operating control in the form of a cam disc.

In accordance with a further elaboration of the invention, it is preferred for the valve to have a throttling effect in its open position. This feature provides for "atomization" or "foaming" of the liquid sucked in by the valve, which is particularly advantageous from a deaeration point of view and is attributable inter alia to the reduced pressure built up during the closed condition of the valve. Thus, the reduced pressure has a deaeration function in the reservoir not only during the closed condition of the valve but also after the valve has been opened, and the continuously rotating pump provides for the separation of air from the liquid during both the open and the closed interval of the throttle valve, and so the deaeration process is continuously operative.

The invention further relates to an apparatus for practicing a deaeration method as described hereinabove. To that end, in accordance with the invention, such an apparatus comprises a supply pipe to be connected to a liquid circulation system and which includes a throttle valve adapted to be closed and opened periodically; a liquid reservoir into which the supply pipe opens and which is equipped with a float-controlled air relief valve with a non-return valve or a different valve controllable so as to allow air to pass in one direction only; and a discharge pipe to be connected to the liquid circulation system and which includes a pump. Thus, an extremely effective and in fact continuously operating deaeration apparatus can be realized with a minimum of parts and control means. Furthermore, by virtue of the small number of elements, the apparatus is not only relatively cheap but also relatively insusceptible to malfunction because of its simplicity.

BRIEF DESCRIPTION OF THE DRAWING

With reference to an exemplary embodiment shown in the drawings, the deaeration apparatus according to the invention will now be further clarified and explained. In the drawings.

DETAILED DESCRIPTION OF THE PREFERRED EMBODIMENT

Figure 1:
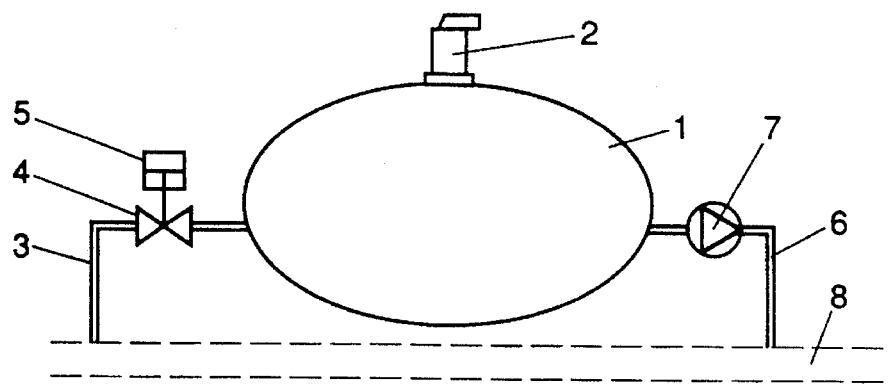
FIG. 1 diagrammatically shows an elevation of a deaeration apparatus according to the invention.

The deaeration apparatus shown in FIG. 1 comprises a closed reservoir 1 with a vent unit 2, such as, for instance, a float-controlled deaerator known from U.S. Pat. No. 4,027,691, the discharge of which comprises a non-return valve. It is noted that it is also possible to choose, instead of a non-return valve, a valve which can be controlled in such a manner that it allows air to pass in one direction only, for instance a power-controlled magnetic valve.

Connecting to the reservoir is a supply pipe 3, which includes a throttle valve 4, which can be set alternately in the open and in the closed position by a control unit 5. Further connecting to the reservoir 1 is a discharge pipe 6, which includes a pump 7, for instance a high-pressure pump. The supply pipe 3 and the discharge pipe 6 connect to a pipe 8, designated by broken lines, of a liquid circulation system (not shown).

Figure 2:
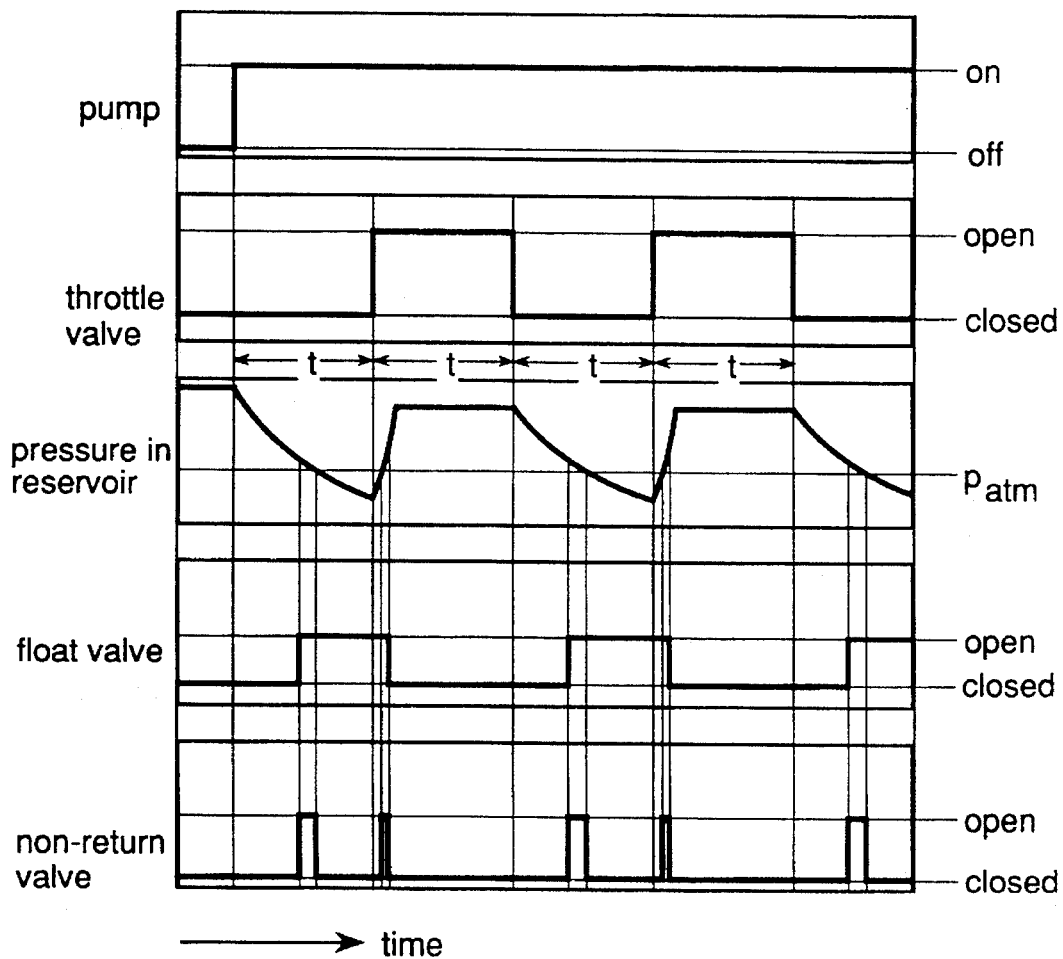
FIG. 2 shows the operation of the deaeration apparatus according to FIG. 1 in a number of diagrams.

In operation the above-described deaeration apparatus when connected to a liquid circulation system works as follows:

The deaeration apparatus is put into operation by switching on the pump 7. This is represented in the top diagram in FIG. 2, the next diagram indicating that the throttle valve 4 is then in the closed position. Further, the assumption is that the pressure, as indicated in the third diagram, and the level in the reservoir 1 are such that the float valve and the non-return valve in the vent unit 2 are also in the closed position, as is shown in the two lowermost diagrams.

The continuously sucking pump 7 constantly attempts to withdraw water from the reservoir, so that both the liquid level and the pressure in the reservoir 1, as shown in the relevant diagram, are reduced. As is generally known, the pressure reduction leads to the separation of air from the liquid, the air collecting in the upper part of the reservoir 1. The pressure reduction is accompanied by the withdrawal of water and hence by a decrease of the liquid level in the reservoir 1, which at a certain point leads to the opening of the float-controlled valve, as is shown in the last diagram but one. The pressure in the reservoir 1 is then still superatmospheric, as appears from the middle diagram, so that the opening of the float-controlled valve also leads to the non-return valve being pressed open and air being blown off, until the pressure is atmospheric and the non-return valve closes, so that no air can flow into the reservoir 1. After the closure of the non-return valve, while the float-controlled valve remains open due to the decreased level in the reservoir 1, the pressure and the liquid level will decrease further as a result of the continued operation of the pump 7, until the throttle valve 4 is opened.

As soon as this last happens, the liquid will be sucked forcefully through the throttle valve as a result of the underpressure created in the reservoir 1 by the pumping action as well as the uninterrupted continued operation of the pump 7. The forceful suction brings the liquid into a finely divided form, also referred to as "misted" or "foamed", so that air dissolved in the liquid can and will separate considerably more readily than it would from a normally flowing liquid. The separated air again collects in the upper part of the reservoir 1. Also, the pressure and the liquid level in the reservoir 1 will rise, as shown in the middle diagram of FIG. 2. As mentioned and shown in the relevant diagram, the float-controlled valve is still in the open position. As soon as the pressure in the reservoir 1 becomes superatmospheric, he non-return valve, as shown in the bottom diagram, will open again and the collected air is blown off until the level in the reservoir has risen to the extent where the float-controlled valve is closed. Because then the supply of air of superatmospheric pressure is stopped, the non-return valve will close again as well. The pressure in the reservoir will rise further until an equilibrium is attained between the liquid sucked in via the throttle valve 4 and the liquid sucked out by the action of the pump 7, while the suction via the throttle valve 4 continues to result in the fine division of the liquid and hence in the easier separation of the air.

Subsequently this separation process, after the throttle valve 4 has been closed again by the control unit 5, is continued through the underpressure which has been created once again. Thus the separation of air from the liquid is continuously ensured.

The opening and closing of the throttle valve can take place cyclically. Thus, experiments have shown that excellent deaeration results are obtained if the throttle valve is alternately closed and opened for 15 seconds. Of course, other values can be chosen as well, such as 10 and 30 seconds, and the open period need not always be the same as the closed period, all this depending on properties of the elements used for the deaeration apparatus. With the deaeration apparatus according to the invention, air can be withdrawn from the liquid in an extremely effective manner. It will need little explanation that in that case leaving the apparatus in operation will have little use. Accordingly, the apparatus can be switched off. To keep the liquid in the substantially unsaturated condition, it will typically suffice, given the normal functioning of the liquid circulation system, to switch on the apparatus now and then, for instance once every 24 hours. Of course, it is also possible to choose any other on/off period, depending on various factors.

I claim:

1. A method for deaerating a liquid in a substantially closed liquid circulation system, in which an amount of liquid is withdrawn from the circulation system and is introduced via a valve into a reservoir, the pressure in the reservoir is reduced for aleaerating the liquid and the liquid is sucked from the reservoir by means of a pump and added to the circulation system again, and separated air is discharged via a vent unit to the environment, wherein the valve is alternately opened and closed according to a predetermined timing sequence, while the pump keeps working continuously, the reservoir being closed except for connections to the circulation system, the pump and the vent unit.

2. A method according to claim 1, wherein the valve has a throttling effect in its open position.

3. A method according to claim 2, wherein the valve after being closed for 15 seconds is opened for 15 seconds.

4. A method according to claim 1 wherein the valve after being closed for 15 seconds is opened for 15 seconds.

5. A deaeration apparatus comprising:

a liquid reservoir which is closed except for a supply pipe, an air relief valve and a discharge pipe connected thereto;

the supply pipe being connected to a substantially closed liquid circulation system;

a supply valve disposed in the supply pipe which is opened and closed on a timed basis for controlling the periodic transfer of liquid from the substantially closed liquid circulation system via the supply pipe to the reservoir;

the air relief valve operable in one direction only for allowing air to escape from the reservoir;

the discharge pipe being connected to the liquid circulation system; and a pump disposed in the discharge pipe for continuously discharging liquid from the reservoir to the liquid circulation system thereby reducing the pressure in the reservoir and aiding in the discharge of air from the liquid in the reservoir when the valve is closed and wherein air is separated from the liquid when the valve is opened due to dispersion of the liquid in the reduced pressure environment in the reservoir.

6. The apparatus in accordance with claim 5 wherein the air relief valve comprises a float controlled air relief valve.

7. The apparatus in accordance with claim 5 and further comprising a control unit for alternately opening and closing the supply valve.

8. The apparatus in accordance with claim 5 wherein the valve is a throttle valve and the throttle valve is opened after the pressure in the reservoir has reduced by operation of the pump to effect an atomization of liquid entering the reservoir, thereby further aiding in the discharge of air from liquid transferred from the liquid circulation system to the reservoir.

9. A method of deaerating a liquid in a substantially closed liquid circulation system comprising a liquid reservoir which is closed except for a liquid supply pipe connecting the reservoir to the liquid circulation system, an air pressure relief valve and a discharge pipe connecting the reservoir to the liquid circulation system, the method comprising the steps of:

opening a supply valve disposed in the liquid supply pipe to introduce an amount of liquid from the liquid circulation system in the reservoir;

reducing pressure in the reservoir by continuously transferring liquid from the reservoir to the liquid circulation system by a continuously operating pump disposed in the discharge pipe;

periodically closing the supply valve while the pump is operating to create a reduced pressure in the reservoir and subsequently opening the valve thereby periodically introducing an amount of liquid from the liquid circulation system in the reservoir and deaerating liquid introduced in the reservoir from the liquid circulation system; and discharging air separated from the water from the reservoir via the air pressure relief valve;

whereby deaeration of liquid is enhanced by the periodic introduction of liquid from the liquid circulation system into the reservoir while liquid is continuously withdrawn from the reservoir.

10. Apparatus for deaerating a liquid in substantially closed liquid circulation system, the apparatus comprising:

reservoir means which is closed except for liquid supply pipe means, discharge pipe means and relief valve means connected thereto;

the liquid supply pipe means for connecting the liquid circulation system to the reservoir means;

supply valve means disposed in the liquid supply pipe means for introducing an amount of liquid from the liquid circulation system into the reservoir means;

the discharge pipe means for connecting the reservoir means to the liquid circulation system;

pump means disposed in the discharge pipe means for reducing pressure in the reservoir by continuously transferring liquid from the reservoir means to the liquid circulation system; and valve control means for periodically closing the supply valve means while the pump means is operating to create a reduced pressure in the reservoir means and for subsequently opening the valve means for introducing an mount of liquid from the liquid circulation system in the reservoir means, whereby liquid introduced in the reservoir from the liquid circulation system is deaerated;

the relief valve means for discharging from the reservoir air separated from liquid introduced in the reservoir.

\* \* \* \* \*